3,711,539
NONSOLVENT AIR OXIDATION OF p-XYLENE
Theodore A. Koch, Holly Oak, and Herbert S. Eleuterio,
Wilmington, Del., assignors to E. I. du Pont de
Nemours and Company, Wilmington, Del.
No Drawing. Filed Sept. 3, 1968, Ser. No. 757,157
Int. Cl. C07c 51/42, 63/02
U.S. Cl. 260—524 R                   9 Claims

ABSTRACT OF THE DISCLOSURE

Making terephthalic acid by oxidizing p-xylene, at 160° to 220° C., without solvent, under pressure sufficient to maintain oxidizable material in a liquid phase, agitating the mixture and during oxidation removing from the reaction mixture water formed therein and obtaining an oxidate containing terephthalic acid and intermediate oxidation products that is washed with a single ring aromatic hydrocarbon, e.g., p-xylene, at 250° to 350° C. to remove hydrocarbon soluble intermediate oxidation products and recovering solid terephthalic acid.

BACKGROUND OF THE INVENTION

Field of the invention

This invention relates to a process for making terephthalic acid, and more particularly, to the oxidation of p-xylene to terephthalic acid without solvent.

Description of the prior art

Many methods have been disclosed for the oxidation of methyl-substituted aromatic compounds, such as xylenes and tolualdehydes, by molecular oxygen, particularly the air oxidation of p-xylene, p-tolualdehyde or p-toluic acid to terephthalic acid. However, all of these methods have certain serious disadvantages. For example, phthalic acids have been made by oxidizing methyl-substituted benzenes in solution in an aliphatic monocarboxylic acid which also contains heavy metal catalysts such as cobalt and an oxidation promoter such as bromide. The presence of the bromide promotor substantially increases the cost of the process in addition to the fact that the bromide promoter increases the corrosivity of the oxidation medium. Another method for making phthalic acids involves adding a ketone promoter to an oxidation system containing for example p-xylene, a metal catalyst and large quantities of a monocarboxylic aliphatic acid. This process involves making, as a coproduct a large quantity of aliphatic acid, usually acetic acid, which must be sold in order for the process to be economically attractive. Processes, such as those described above, for making phthalic acids prior to this invention were conducted under conditions that required the presence of aliphatic monocarboxylic acids such as acetic, propionic, butyric, caproic and the like. If sufficient solvent was not present, usually in weight ratios of solvent to aromatic reactant of from 8.1 to 16:1 and higher, the reaction mixture was difficult to agitate, reactants were trapped and intermediate oxidation products were not leached out and oxidized. Therefore, there is a need for a process for making terephthalic acid in high yields under solventless conditions thus obviating the problem of handling large volumes of solvent and the attendant costly corrosion problems associated with heretofore known oxidation processes.

SUMMARY OF THE INVENTION

This invention provides an improved process for oxidizing p-xylene in the absence of solvent and without conventional promoters and obtainig high yields of terephthalic acid. More specifically, the invention comprises oxidizing p-xylene with molecular oxygen in the presence of heavy metal catalyst, conducting the oxidation reaction without solvent and maintaining the oxidation reaction mixture at a temperature within the range of about from 160° to 220° C., preferably 180° C. to 200° C., and at a pressure sufficient to maintain oxidizable material in a liquid phase while agitating said mixture and during oxidation removing from the oxidation reaction mixture water formed therein and obtaining an oxidate containing terephthalic acid and intermediate oxidation products, e.g., toluic acid, washing the oxidate heated at a temperature between about from 250° C. to 350° C., preferably 290° C. to 300° C., with a single ring aromatic hydrocarbon, preferably p-xylene, in order to extract therefrom intermediate oxidation products, e.g., toluic acid and/or formyl-benzoic acid and other hydrocarbon soluble intermediate oxidation products from the oxidate, and recovering solid terephthalic acid.

Water is formed during the oxidaiton reaction under the process conditions described and said water, either in vapor or liquid form, must be removed during the oxidation reaction. This is simply and conveniently done by providing the oxidizer with any conventional means for allowing removal of water. For example, under the reaction conditions water is entrained with the exit gases, e.g., nitrogen, carbon monoxide, either present or generated during the reaction and removed with said exist gases and/or distilled therefrom and discarded. In any event, water, as liquid and/or vapor, is removed from the oxidation reaction mixture during oxidation. Pressure at least sufficient to keep the oxidizable material in a liquid phase is used. The oxidation reaction mixture is agitated by any suitable means, e.g., turbulent mixing by mechanical stirrers, sub-surface sparging of the reaction mixture with oxygen or a combination of these or other means. The catalytically oxidized p-xylene is converted to an oxidate, containing terephthalic acid and intermediate oxidation products, which is heated at a temperature of about from 250° C. to 350° C., preferably about from 290° to 300° C., and washed with a single ring aromatic hydrocarbon e.g., benzene, toluene, xylene or mixtures thereof, preferably p-xylene, in which the intermediate oxidation products are soluble, wherein the hydrocarbon soluble components are separated from the hydrocarbon insoluble terephthalic acid. Advantageously, and quite surprisingly, the intermediate oxidation products can be recycled for reuse in the process without entailing a loss in yield of terephthalic acid due to impurity build-up in the recycle stream. Sufficient pressure, e.g. 300 to 500 p.s.i.g., can be applied during the washing step to keep the hydrocarbon, e.g., zylene, liquid. The solid terephthalic acid that is insoluble in the hydrocarbon is removed by any suitable means, e.g. filtration.

DETAILED DESCRIPTION OF THE INVENTION

One preferred embodiment of this invention is illustrated schematically by the drawing below:

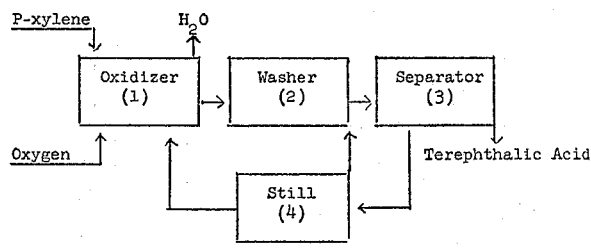

In the drawing, which illustrates a process for the oxidation of p-xylene to terephthalic acid, without solvent, oxygen, e.g., air is fed sub-surface through a filter to oxidizer 1 containing p-xylene alone, or in admixture with terephthalic acid intermediate oxidation products, such as p-tolunic acid, p-tolualdehyde, p-formylbenzoic acid recycled for reuse in the process from separator 3. The oxidation reaction is carried out at 160° C. to 220° C. with sufficient pressure to keep the reactants in a liquid phase, e.g., 160° C. with 300#/sq. in. pressure, in the presence of heavy metal catalyst e.g., cobalt or manganese containing catalyst. The reaction mixture is agitated by any suitable means, for example, stirrers, gas-dispersing agitator, e.g., "gasperator," or by the sub-surface addition of air or a combination thereof. Under such conditions water formed during the oxidation reaction is removed from the oxidation reaction mixture with the exit gases and/or by distillation. A preferred means for removing water of reaction is to employ a decanter at the base of an off-gas condenser which collects water from the off-gas. If any oxidizable material such as p-xylene is removed with the water it can be fractionated therefrom by means of a decanter condenser and recirculated to the oxidizer for reuse in the process. The oxidation is carried out preferably to about a 30 to 40% conversion to terephthalic acid in order to maintain a workable slurry. The oxidate, or products of oxidation, are mixed, in situ, with a single ring aromatic hydrocarbon, preferably p-xylene in washer 2 and heated to about 250° C. to 350° C., especially 290° C. to 300° C., preferably under sufficient pressure to keep the hydrocarbon liquid. The mixture is held in washer 2 so that intermediate oxidation products that are soluble in the hydrocarbon are extracted from the oxidate. The mixture is subsequently cooled and readily separated due to the large crystal size of the acid by, for example, filtration in separator 3 and solid terephthalic acid recovered. The filtrate contains primarily p-xylene, p-tolualdehyde and p-formylbenzoic acid in addition to other intermediate oxidation products is returned to oxidizer 1, or a portion of the p-xylene is stripped from the filtrate in still 4 and returned to washer 2.

The heavy metal catalysts that are used in the process can be any of those conventionally used in the oxidation of p-xylene to terephthalic acid with molecular oxygen, including those of the heavy metals shown on pages 56 and 57 of Lang's Handbook of Chemistry, 9th ed. 1956. Preferably, the catalyst comprises a heavy metal having an atomic number of 25 to 28 inclusive, and most preferably is cobalt or manganese. Mixtures of heavy metals can be employed also. The heavy metal can be introduced into the system in any form, the only requirement being that it be soluble in the system or reacted with some component of the system to become soluble. Thus, the heavy metal can be in the form of metal, oxide, or salt, such as acetate, carbonate, nitrate, naphthanate and the like. Peferably the oxidation catalyst is a heavy metal metallic soap of cobalt or manganese such as cobalt naphthanate, cobalt linoleate, cobalt phthalate, manganese naphthanate, manganese 2-ethylhexoate, and cobalt naphthanate being the catalyst of choice. The heavy metal catalyst that is introduced in the system be it soluble per se or react to yield a compound which is soluble, the ultimate form of the catalyst should be soluble at least to the extent necessary to provide the desired quantity of active heavy metal, usually at least about 0.02% (calculated as metal) based on the weight of the reaction mixture. Advantageously, only small amounts of catalyst, e.g. 0.02 to 0.2%, are needed for the successful operation of the process but larger amounts, e.g. up to about 5%, can also be used.

The oxidation step of this invention can be conducted with molecular oxygen as oxidizing agent either as pure oxygen, air, oxygen-enriched air, or other mixtures of oxygen with inert gases such as $CO_2$, nitrogen and argon. Air or enriched air with up to about 50% oxygen is especially preferred because of the rapidity of oxidation and low cost. The oxidizing agent, usually air, is fed into the oxidizer at a rate to maintain a positive oxygen content, i.e., analysis of the off-gases from the oxidizer indicates the presence of oxygen. Flow rates of the oxidizing agent are generally about 1 to 3 standard cubic feet per minute per pound of oxidizable material and preferably about 1.5 to 2.5 s.c.f.m./lb. of oxidizable material, all of which provide a positive oxygen content in the oxidation reaction mixture. Preferably, the oxidizing agent is introduced by subsurface techniques in order to agitate the reaction mixture. Vigorous agitation, e.g. 200–2000 r.p.m., with mechanical stirrers has been found to be a very satisfactory means for providing contact of the oxidizable material with the oxidizing agent.

The reaction temperature during oxidation is maintained at about 160° to 220° C. preferably 180° to 200° C. The temperature required during oxidation, using the procedure described herein, is higher than that normally used in such catalytic oxidation processes. Sufficient superatmospheric pressure is employed during the oxidation reaction so as to keep the oxidizable material, i.e. hydrocarbons, in a liquid phase. Generally, pressures of the order of 100 to 400 p.s.i.g., preferably 150 to 300 p.s.i.g., are used with corresponding temperatures disclosed hereinabove The products of oxidation, herein referred to as the oxidate, resulting from the solventless oxidation of p-xylene comprise terephthalic acid and intermediate oxidation products co-precipitated therewith. The removal of terepthalic acid from the intermediate oxidation products is normally a difficult task. The present process involves a procedure in which the intermedaite oxidation products can be readily separated from terephthalic acid and reused in the process. This is accomplished by washing the oxidate, heated at a temperature between about from 250° C. to 350° C., preferably 290° C. to 300° C., with a single ring aromatic hydrocarbon in order to extract therefrom intermediate oxidation products soluble in the hydrocarbon, and recovering solid terephthalic acid. Under the conditions described herein high purity terephthalic acid is obtained. However, to assure that highest purity, e.g. 97.5 to 99.5%, terephthalic acid is obtained, preferably, the washing step is conducted at temperatures of at least about 290° C. Higher temperatures give substantially the same high degree of purity but temperatures in excess of about 350° during the washing step result in undesirable side reactions and best results are obtained when the oxidate washing is conducted at about from 290° to 300° C. Particularly suitable aromatic hydrocarbons that can be used to wash the oxidate, thereby extracting hydrocarbon soluble intermediate oxidation products, are single ring benzenoid hydrocarbons, substituted or unsubstituted, having a boiling point within the range of about 81°–250° C., such as benzene, toluene and xylenes, the latter being preferred, especially p-xylene. The oxidate can be washed in a single or multi-stage process in a digestor by merely contacting the oxidate and aromatic hydrocarbon by, for example, gentle agitation until the intermedaite oxidation products are removed from the solid terephthalic acid. Preferably, the oxidate is washed at elevated temperatures, at least about 290° C., and at sufficient pressure e.g., about 300 to 500 p.s.i.g., and especially 350–400, to keep the aromatic hydrocarbon in liquid phase.

The weight ratio of hydrocarbon washing liquid to oxidate employed during the washing step can be surprisingly low, and a ratio of liquid to oxidate between 1:1 to 1:4 is generally suitable, although ratios of the order of 1:0.5 to 1:20 can be used, however, no particular advantages regarding purification results therefrom by virtue of using large amounts of wash liquid. The intermediate oxidation products soluble in the hydrocarbon are usually recycled in the system for further oxidation. The remaining solid terephthalic acid in surprisingly large crystal size is readily separated from the liquid portion of the oxidate by any means such as filtration, decantation or centrifuging, and excess hydrocarbon, e.g., p-xylene, in the filter cake can be removed therefrom by, for example, steam stripping. Prior to separation, the oxidate can be cooled, e.g., 100° to 200° C., to aid in the separation and recovery of terephthalic acid from intermedaite oxidation products. Analysis of the stream recycled to the oxidizer indicates substantially no build-up in impurities occurs during successive recycles. This indicates that substantially all of the filtrate recycled to the oxidizer for reuse in the process contains only intermediate oxidation products and thus high yields of terephthalic acid can be obtained by recycling the intermediate oxidation products.

For a clearer understanding of the invention, the following specific examples are given. These examples are intended to be merely illustrative of the invention and are not to be considered limitations thereof.

EXAMPLE 1

Into a two-liter autoclave, equipped with a turbine paddle "gasperator" agitator, four-vane baffle and condenser separator for removal of water and recirculation of p-xylene, is charged 700 milliliters of p-xylene and 300 parts per million cobalt naphthanate. Air is fed using a sub-surface feed at an initial rate of 2.5 standard cu. ft./ minute. The contents of the autoclave is heated to 170° to 180° C. at 200 to 250 p.s.i.g. at an agitator speed of 1750 r.p.m. and water of reaction is removed by entrainment in the exit gases during oxidation. The level of oxygen in the off-gas varied from 2.5% at the beginning of oxidation to 22% when oxidation was completed over a 120-minute period thus indicating a positive oxygen content was maintained during oxidation. At the conclusion of oxidation the air flow rate was 0.5 s.c.f.m. The total of 134.5 grams of water was collected and 130 cc. of unreacted p-xylene is recovered. The oxidate contained primarily terephthalic acid and intermediate oxidation products of p-xylene primarily p-toluic acid and p-formylbenzoic acid.

The oxidate, in the amount shown below, is heated in an autoclave to the temperatures and pressure indicated below and washed with p-xylene under gentle agitation for 15–20 minutes. The mixture is cooled to about 135° C. and solid terephthalic acid is separated from the intermediate oxidation products soluble in p-xylene by filtration and the filtrate recycled for reuse in the process.

| Oxidate (grams) | Ratio p-xylene to oxidate | Temperature (° C.) | Pressure (p.s.i.g.) | Terephthalic acid in residue (percent) |
|---|---|---|---|---|
| 116 | 5.19 | 290 | 400 | 99 |
| 100 | 12.9 | 300 | 450 | 99 |
| 300 | 2.29 | 180 | 200 | 94 |

EXAMPLE 2

To a one-gallon autoclave 600 grams of p-xylene and 4 grams of cobalt naphthanate is charged. The reaction mixture is agitated with a "gasperator" at 500 r.p.m. at a variable air feed rate of 0.4 to 2.5 s.c.f.m. A four-vane baffle is inserted in the autoclave to assist agitation. Air is added to the reactor sub-surface through a 25 micron filter. The temperature of the reaction mixture is 180° C. which is held at 300 p.s.i.g. for about 90 minutes. The off-gas passes through a condenser where condensate drops to a decanter, prefilled with p-xylene, thus returning p-xylene to the reactor and removing water of reaction from the system. After about 90 minutes there is no further oxygen consumption by the reaction mixture as indicated by the percent oxygen in the off-gas thus indicating the reaction is complete. The resulting oxidate contains primarily terephthalic acid and intermediate oxidation products of p-xylene, such as p-toluic acid and p-formylbenzoic acid. The oxidate is washed with p-xylene, heated to a temperature of 300° C. and under a pressure of 500 p.s.i.g. for 15 minutes. Water present in the oxidate is removed due to temperature and pressure conditions. The ratio of p-xylene to oxidate was 1:1. The mixture is cooled to 150° C. and filtered to remove the solid terephthalic acid from the p-xylene soluble oxidation products.

EXAMPLE 3

A mixture of 258 grams p-xylene, 600 grams p-toluic acid and 4.9 grams cobalt naphthanate is charged to a one-gallon autoclave. The charge is heated to 108° C., pressurized to 300 p.s.i.g. and stirred at 1900 r.p.m. with a "gasperator." Air is initially fed sub-surface through a 25 micron filter at a rate of 0.75 s.c.f.m. The oxygen in the off-gas reaches a minimum concentration and then rises but at all times the the oxidation reaction has a positive oxygen content. As the off-gas oxygen content rises back to 5% the air feed is reduced to 0.38 s.c.f.m. and a p-xylene-cobalt naphthanate solution is fed at a fixed rate. The off-gas is passed through a condenser where condensate drops to a decanter, prefilled with p-xylene, thus returning p-xylene to the reactor and removing water of reaction from the system. The resulting oxidate contains primarily terephthalic acid and intermediate oxidation products primarily p-toluic acid and p-formylbenzoic acid. The oxidate is mixed with approximately a 1:1 weight ratio with p-xylene and washed with p-xylene at 300° C. and 500 p.s.i.g. The mixture is cooled to about 135° C. and solid terephthalic acid is separated by decantation from the intermediate oxidation products soluble in p-xylene by filtration and said intermediate oxidation products are recycled to the oxidizer for reuse in the process.

I claim:

1. In a process for the manufacture of terephthalic acid which comprises oxidizing p-xylene with molecular oxygen in the presence of heavy metal catalyst, the improvement which comprises:
   (a) conducting the oxidation reaction without solvent and maintaining the oxidation reaction mixture at a temperature within the range of about from 160° C. to 220° C. and at a pressure sufficient to maintain oxidizable material in a liquid phase while agitating said mixture and during oxidation removing from the oxidation reaction mixture water formed therein and obtaining an oxidate containing terephthalic acid and intermediate oxidation products,
   (b) washing the oxidate heated at a temperature at least about 290° to 350° C. with a single ring aromatic hydrocarbon in order to extract therefrom intermediate oxidation products including p-formylbenzoic acid, and
   (c) recovering large crystals of terephthalic acid.

2. A process of claim 1 wherein the oxidate is washed with p-xylene.

3. A process of claim 2 wherein xylene-soluble intermediate oxidation product is recycled for reuse in the process.

4. A process of claim 2 wherein the weight ratio of oxidate to p-xylene in the washing step is about 1:0.5 to 1:20.

5. A process of claim 2 wherein the heavy metal catalyst is cobalt-containing.

6. A process of claim 2 wherein the oxidate, subsequent to washing, is cooled to about from 100° to 200° C. to aid in the separation of terephthalic acid from intermediate oxidation product.

7. A process of claim 2 wherein the oxidation reaction mixture has a positive oxygen content.

8. A process of claim 2 wherein the pressure during oxidation is 150 to 300 p.s.i.g.

9. A process of claim 2 wherein the weight ratio of oxidate to p-xylene in the washing step is between 1:1 to 1:4.

References Cited

UNITED STATES PATENTS 2,572,710  10/1951  Emerson et al. _____ 260—525
3,522,298   7/1970  Bryant et al. _____ 260—525

LORRAINE A. WEINBERGER, Primary Examiner

R. S. WEISSBERG, Assistant Examiner

U.S. Cl. X.R.

260—525